W. S. AVERY.
SPOON HOLDER.
APPLICATION FILED NOV. 10, 1915.
1,182,732.
Patented May 9, 1916.
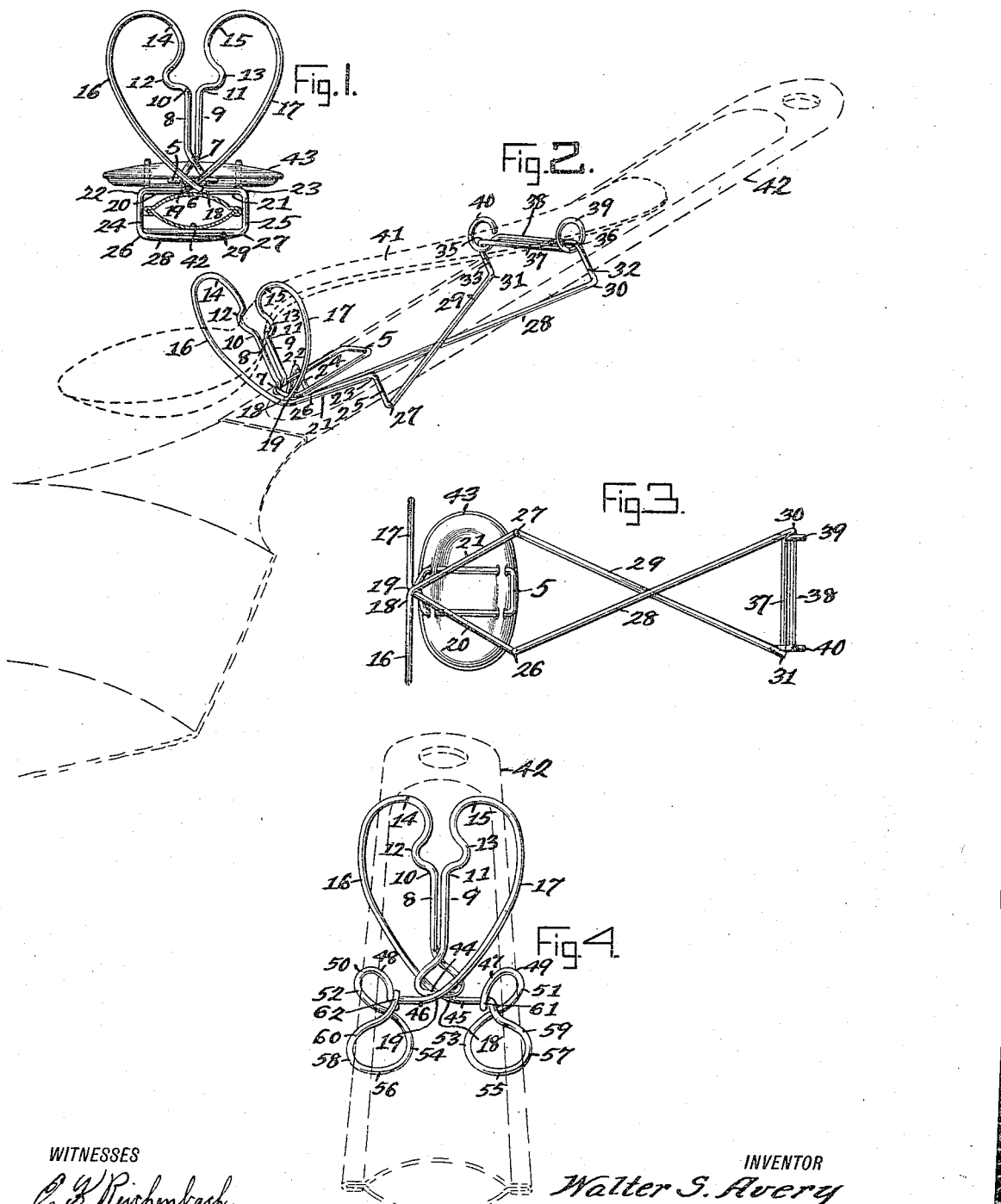
WITNESSES
INVENTOR
Walter S. Avery
BY
ATTORNEYS

UNITED STATES PATENT OFFICE.

WALTER SANFORD AVERY, OF KNOXVILLE, TENNESSEE.

SPOON-HOLDER.

1,182,732.  Specification of Letters Patent.  Patented May 9, 1916.

Application filed November 10, 1915. Serial No. 60,720.

*To all whom it may concern:*

Be it known that I, WALTER S. AVERY, a citizen of the United States, and a resident of Knoxville, in the county of Knox and State of Tennessee, have invented certain new and useful Improvements in Spoon-Holders, of which the following is a specification.

My invention relates to spoon or knife holders for use on the handles of cooking utensils, such as frying pans and the like, and the main object thereof is to provide such devices which are quickly and easily placed in position, which adapt themselves to handles of different shapes and sizes, which hold spoons or knives in either flat or edge positions, and which are comparatively inexpensive.

My invention is fully described in the following specification, of which the accompanying drawings form a part, in which like characters refer to like parts in each of the views, and in which:—

Figure 1 is a front end view of one form of my invention in position for use on a handle shown in section; Fig. 2 is a perspective view thereof with a handle and spoon indicated by dotted lines, and a portion shown in Fig. 1 omitted for the sake of clearness; Fig. 3 is a bottom plan view thereof; and Fig. 4 is a view of a modification.

The form shown in Figs. 1 to 3, inclusive, consists of a length of wire bent centrally to form a loop 5 the wire portions then being bent upwardly at 6 and crossed at 7 to form parallel members 8 and 9 bent outwardly at 10 and 11 and inwardly curved at 12 and 13 again curved upwardly at 14 and 15 and downwardly and inwardly at 16 and 17.

The wire portions are crossed at 18 and 19 and bent to form members 20 and 21 beneath the loop 5 and rearwardly divergent, said portions being then bent downwardly at 22 and 23 to form members 24 and 25 again bent at 26 and 27 to form rearwardly directed and crossed members 28 and 29 of relatively great length. The portions are then bent upwardly at 30 and 31 to form members 32 and 33 and again bent inwardly at 35 and 36 to form parallel members 37 and 38 having loops 39 and 40 at their ends encircling the members 38 and 37, respectively.

The space inclosed by the wire at the bends 10, 11, 12 and 13 is adapted to receive and tensionally hold the lower end of a spoon handle 41, and the loops 39 and 40 similarly hold the upper part of said handle, although the handle may merely rest upon the members 37 and 38 and not be engaged by the said loops. The handle 41, or a knife, may be forced edgewise between the vertical members 8 and 9 and be held against any displacement, the crossing at 7 permitting separation of these members 8 and 9 under the pressure of the spoon or knife insertion in either position.

The crossing of the wire portions at 18 and 19 permits the vertical members 24 and 25 to be manually moved outwardly and away from each other to allow the end of the handle 42 of a cooking utensil to be introduced between said members 24 and 25, from the front of the holder, said handle being then moved rearwardly over the members 28 and 29 and beneath the members 37 and 38, the crossing of the members 28 and 29 permitting separation of the vertical members 32 and 33 to allow the passage of the pan handle. When the device has been brought to the desired position on the pan handle the spring in the wire holds the vertical members 24 and 25, and 32 and 33, against the respective sides of the pan handle 42, though in a yielding manner whereby the device is frictionally held and may be moved along the pan handle at will.

I may, under certain conditions, employ a disk or button 43 on the loop 5, which disk may carry matter of an advertising nature, and the device may be given away by the advertiser, but I do not desire to limit myself to the use of the disk, nor to the formation thereof, nor to its manner of attachment to the device.

The form shown in Fig. 4 comprises the heart-shaped portion of the form already described but the loop 44 is made smaller than the loop 5 and is vertically and transversely arranged instead of horizontal as is the loop 5 and rests between the members 16 and 17 at the crossing points 18 and 19.

The lower portion of the device differs from the form described for pan handle engagement, the members 16 and 17 being bent outwardly to form members 45 and 46 in the same plane, the wire portions being then bent rearwardly at 47 and 48, outwardly at 49 and 50, downwardly at 51 and 52, inwardly at 53 and 54, curved outwardly at 55 and 56, bent upwardly at 57 and 58, inwardly at 59 and 60, and twisted about the members 45 and 46 at 61 and 62, the foot portions thus formed being for pan handle engagement and being adapted to be forced away from each other because of the crossing at 18 and 19.

The spoon or knife engagement means are common to both forms, the pan handle engagement means alone differing, but the last described form does not provide the rest for the upper part of the handle of the spoon or knife as does the first form.

Having fully described my invention, what I claim as new, and desire to secure by Letters Patent, is:—

1. A spoon holder, comprising a length of wire bent centrally to form a loop and the arms of which are arranged vertically and parallel for a predetermined distance to form a spring slot, then reversely curved to jointly form a spoon handle receiving pocket, then into heart-shaped form, and the ends formed into pan handle engaging members.

2. A spoon holder, comprising a length of wire bent centrally to form a loop and the arms of which are arranged vertically and parallel for a predetermined distance and reversely curved to jointly form a spoon handle receiving pocket, then curved into heart-shape, then rearwardly directed to form two sets of vertical pan handle engaging members, then bent transversely to form parallel members serving as a rest for the spoon handle, and then formed into loops engaging the respective rest members.

In testimony whereof I have signed my name to this specification in the presence of two subscribing witnesses.

WALTER SANFORD AVERY.

Witnesses:
CHAS. O. HILL,
J. J. CULLAWAY.

Copies of this patent may be obtained for five cents each, by addressing the "Commissioner of Patents Washington, D. C."